United States Patent
Lee et al.

(10) Patent No.: US 11,104,800 B2
(45) Date of Patent: Aug. 31, 2021

(54) RESIN COMPOSITION FOR VEHICLE PARTS, VEHICLE PART MANUFACTURED USING THE RESIN COMPOSITION, AND METHOD OF MANUFACTURING THE VEHICLE PART

(71) Applicants: HYUNDAI MOTOR COMPANY, Seoul (KR); KIA MOTORS CORPORATION, Seoul (KR); KOREA ENGINEERING PLASTICS CO., LTD, Seoul (KR)

(72) Inventors: Dong Uk Lee, Seoul (KR); Won Jin Seo, Suwon-si (KR); Sung Hyun Lee, Yongin-si (KR); Soon Joon Jung, Seoul (KR); Bong Joo Park, Goyang-si (KR); Jae Won Moon, Siheung-si (KR)

(73) Assignees: HYUNDAI MOTOR COMPANY, Seoul (KR); KIA MOTORS CORPORATION, Seoul (KR); KOREA ENGINEERING PLASTICS CO., LTD, Seoul (KR)

(*) Notice: Subject to any disclaimer, the term of this patent is extended or adjusted under 35 U.S.C. 154(b) by 115 days.

(21) Appl. No.: 16/410,456

(22) Filed: May 13, 2019

(65) Prior Publication Data

US 2020/0181406 A1 Jun. 11, 2020

(30) Foreign Application Priority Data

Dec. 10, 2018 (KR) .................. 10-2018-0158189

(51) Int. Cl.
| | |
|---|---|
| C08L 77/00 | (2006.01) |
| C08L 23/06 | (2006.01) |
| C08L 83/04 | (2006.01) |
| C08L 77/06 | (2006.01) |
| C08K 3/22 | (2006.01) |
| C08K 7/18 | (2006.01) |
| C08K 3/36 | (2006.01) |
| B60R 22/26 | (2006.01) |
| B60N 2/80 | (2018.01) |

(52) U.S. Cl.
CPC ................ *C08L 77/06* (2013.01); *C08K 3/22* (2013.01); *C08K 3/36* (2013.01); *C08K 7/18* (2013.01); *C08L 23/06* (2013.01); *C08L 77/00* (2013.01); *C08L 83/04* (2013.01); *B60N 2/80* (2018.02); *B60R 22/26* (2013.01); *C08K 2003/2244* (2013.01); *C08K 2201/005* (2013.01); *C08K 2201/006* (2013.01)

(58) Field of Classification Search
CPC .......... C08L 77/00; C08L 23/06; C08L 83/04
See application file for complete search history.

(56) References Cited

U.S. PATENT DOCUMENTS

| | | | | |
|---|---|---|---|---|
| 5,891,548 A | * | 4/1999 | Graiver | B82Y 30/00 204/157.41 |
| 6,617,381 B1 | * | 9/2003 | Kumaki | C08K 7/04 524/112 |
| 2014/0316041 A1 | * | 10/2014 | Mehta | C08L 59/04 524/323 |

FOREIGN PATENT DOCUMENTS

| | | |
|---|---|---|
| CN | 105400053 A | 3/2016 |
| JP | H10-182892 A | 7/1998 |
| JP | 2002-138212 A | 5/2002 |
| KR | 10-1607894 B1 | 3/2016 |
| KR | 10-2017-0139248 A | 12/2017 |
| KR | 10-1827781 B1 | 2/2018 |
| WO | 2008/106631 A1 | 9/2008 |

OTHER PUBLICATIONS

Machine translation of KR 10-2017-139248 A, published Dec. 19, 2017.*

* cited by examiner

*Primary Examiner* — Vickey Nerangis
(74) *Attorney, Agent, or Firm* — McDonnell Boehnen Hulbert & Berghoff LLP

(57) ABSTRACT

The present disclosure relates to a resin composition for vehicle parts, a vehicle part manufactured using the resin composition, and a method of manufacturing the vehicle part. Ultra-high molecular weight siloxane and an inorganic filler are mixed with an alloy resin of polyamide and polyethylene at an optimal rate in order to improve friction resistance and wear resistance while maintaining excellent impact resistance and low hygroscopicity. When a vehicle part is manufactured using the resin composition, it is possible to eliminate the application of silicone-based oil or to remarkably reduce the amount of silicone-based oil that is used, whereby it is possible to reduce manufacturing costs. Furthermore, ingredients that are harmful to human beings, such as POM, are not included, whereby it is possible to improve the quality of air in a vehicle.

13 Claims, No Drawings

RESIN COMPOSITION FOR VEHICLE PARTS, VEHICLE PART MANUFACTURED USING THE RESIN COMPOSITION, AND METHOD OF MANUFACTURING THE VEHICLE PART

CROSS REFERENCE TO RELATED APPLICATION

This application claims, under 35 U.S.C. § 119(a), the benefit of priority to Korean Patent Application No. 10-2018-0158189 filed on Dec. 10, 2018, the entire contents of which are incorporated herein by reference.

BACKGROUND

(a) Technical Field

The present disclosure relates to a resin composition for vehicle parts that exhibits improved friction resistance and wear resistance while maintaining excellent impact resistance and low hygroscopicity, a vehicle part manufactured using the resin composition, and a method of manufacturing the vehicle part.

(b) Background Art

The operating performance of plastic vehicle parts is an important factor for determining quality. For example, in the case of a headrest, silicone-based oil is applied to the interface between a stay (for example, iron) and a guide (for example, polyamide) in order to secure the operating performance of the headrest. Also, in the case of a D-ring of a seat belt, polyoxymethylene (POM), which exhibits excellent friction and wear performance, is used as an injection material in order to improve the sensation of withdrawal of webbing.

Polyamide, which is used as a guide material, is engineering plastic that exhibits excellent mechanical properties and high moldability. However, polyamide exhibits low friction resistance and wear resistance, and the dimensions and physical properties of polyamide vary greatly due to the hygroscopicity thereof.

In the case in which polyamide is applied to vehicle parts that are movable, therefore, the operating force of the vehicle parts may be reduced and the vehicle parts may be damaged due to a change in the dimensions and physical properties of polyamide. Also, in the case in which silicone oil is applied in order to secure the operating performance of the vehicle parts, manufacturing costs are increased. Furthermore, in the case in which a passenger comes into contact with the stay when getting into and out of the rear seat of a vehicle, his/her hand may be stained by oil, which lowers the quality. Also, POM, which is used for the D-ring, exhibits excellent friction and wear characteristics, but formaldehyde, which is harmful to human beings, is generated from POM due to the chemical structure thereof.

A conventional alloy resin of high molecular weight polyethylene (HMWPE) and polyamide, exhibiting excellent impact resistance at low temperatures and low hygroscopicity, was developed. However, the operating force of this material is increased because the coefficient of friction is higher than in a conventional silicone oil application system, although the material exhibits excellent impact resistance and low hygroscopicity.

In order to solve this problem, generally well-known silicone oil may be included in a composition of polyamide and high molecular weight polyethylene. Since the silicone oil is not compatible with a matrix resin, however, it is not possible to use more than a predetermined content of the silicone oil. Also, if an excessive amount of the silicone oil is added, phase separation may occur during injection molding, whereby film formation and peeling may occur in the vicinity of a gate. Furthermore, silicone reduces the physical properties of polyamide, whereby the mechanical characteristics of the guide are reduced. As a result, the guide may be deformed when the stay is operated.

Besides, a fluorine-based additive, such as polytetrafluoroethylene (PTFE), may be used in order to reduce the coefficient of friction. In this case, however, manufacturing costs are excessively increased. In addition, the impact resistance of the headrest guide and the D-ring of the seat belt, which is one of the principal physical characteristics thereof, may be reduced.

The above information disclosed in this Background section is provided only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with the prior art.

It is an object of the present disclosure to provide a resin composition for vehicle parts obtained by mixing ultra-high molecular weight siloxane and an inorganic filler with an alloy resin of polyamide and polyethylene at an optimal mixing ratio such that the resin composition for vehicle parts exhibits improved friction resistance and wear resistance.

It is another object of the present disclosure to provide a vehicle part manufactured using the resin composition for vehicle parts.

It is a further object of the present disclosure to provide a method of manufacturing a vehicle part by injection-molding the resin composition for vehicle parts, wherein no silicone-based oil for friction reduction is applied to the vehicle part.

The objects of the present disclosure are not limited to those described above. The objects of the present disclosure will be clearly understood from the following description and could be implemented by means defined in the claims and a combination thereof.

In one aspect, the present disclosure provides a resin composition for vehicle parts, the resin composition including an alloy resin of polyamide and polyethylene, ultra-high molecular weight siloxane (UHMWS), and an inorganic filler.

The resin composition may include 93 to 97.5 wt % of the alloy resin, 2 to 4 wt % of the ultra-high molecular weight siloxane (UHMWS), and 0.5 to 3 wt % of the inorganic filler.

The alloy resin may include 60 to 99 wt % of the polyamide and 1 to 40 wt % of the polyethylene.

The polyethylene may have a weight average molecular weight of 400,000 to 700,000 g/mol.

The alloy resin may have a viscosity (MI, g/10 min) of 0.1 to 10 at 250° C. and a melting point of 215 to 225° C.

The ultra-high molecular weight siloxane (UHMWS) may include 65 to 75 wt % of siloxane polymer and 25 to 35 wt % of fumed silica.

The fumed silica may have an average particle size of 1 to 10 nm and a specific surface area of 50 to 600 m²/g.

The ultra-high molecular weight siloxane (UHMWS) may have a weight average molecular weight of 300,000 to 700,000 g/mol.

The ultra-high molecular weight siloxane (UHMWS) may be formed in a pellet shape having a particle size of 0.1 to 10 μm.

The inorganic filler may be spherical zirconium dioxide.

The zirconium dioxide may have a crystal size of 0.2 to 12.5 μm.

In another aspect, the present disclosure provides a vehicle part manufactured using the resin composition for vehicle parts.

The vehicle part may be a headrest guide or a D-ring of a seat belt.

In a further aspect, the present disclosure provides a method of manufacturing a vehicle part, the method including manufacturing a vehicle part having a predetermined shape using the resin composition for vehicle parts, wherein no silicone-based oil for friction reduction is applied to the vehicle part.

The step of manufacturing the vehicle part may include injection-molding the composition into a vehicle part having a predetermined shape.

The vehicle part may be a headrest guide or a D-ring of a seat belt.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

DETAILED DESCRIPTION

The objects described above, and other objects, features and advantages will be clearly understood from the following preferred embodiments with reference to the annexed drawings. However, the present disclosure is not limited to the embodiments, and may be embodied in different forms. The embodiments are suggested only to offer thorough and complete understanding of the disclosed contents and sufficiently inform those skilled in the art of the technical concept of the present disclosure.

Like reference numbers refer to like elements throughout the description of the figures. In the drawings, the sizes of structures are exaggerated for clarity. It will be understood that, although the terms sufficiently inform those skilled in the art of the technical concepts, corresponding elements should not be understood to be limited by these terms, which are used only to distinguish one element from another. For example, within the scope defined by the present disclosure, a first element may be referred to as a second element, and similarly, a second element may be referred to as a first element. Singular forms are intended to include plural forms as well, unless the context clearly indicates otherwise.

It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element, or an intervening element may also be present. It will also be understood that, when an element such as a layer, film, region or substrate is referred to as being "under" another element, it can be directly under the other element, or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures, among other things. For this reason, it should be understood that, in all cases, the term "about" should be understood to modify all numbers, figures and/or expressions. In addition, when numeric ranges are disclosed in the description, these ranges are continuous and include all numbers from the minimum to the maximum including the maximum within the range unless otherwise defined. Furthermore, when the range refers to an integer, it includes all integers from the minimum to the maximum including the maximum within the range, unless otherwise defined.

It should be understood that, in the specification, when the range refers to a parameter, the parameter encompasses all figures including end points disclosed within the range. For example, the range of "5 to 10" includes figures of 5, 6, 7, 8, 9, and 10, as well as arbitrary sub-ranges such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the range. In addition, for example, the range of "10% to 30%" encompasses all integers that include figures such as 10%, 11%, 12% and 13%, as well as 30%, and any sub-ranges of 10% to 15%, 12% to 18%, or 20% to 30%, as well as any figures, such as 10.5%, 15.5% and 25.5%, between appropriate integers that fall within the range.

Hereinafter, the present disclosure will be described in detail.

As previously described, a conventional alloy resin of polyamide and polyethylene exhibits excellent impact resistance at low temperatures and low hygroscopicity, but the operating force of the alloy resin is increased due to a high coefficient of friction. In the present disclosure, in order to solve this problem, ultra-high molecular weight siloxane and an inorganic filler are mixed with to an alloy resin of polyamide and polyethylene at an optimal rate in order to improve friction resistance and wear resistance while maintaining excellent impact resistance and low hygroscopicity. In addition, it is possible to reduce the generation of noise between connection materials of a vehicle part, whereby it is possible to improve quality and to improve operability through the improvement of friction performance.

In addition, it is not possible to apply silicone-based oil to a vehicle part such as a D-ring of a seat belt. For this reason, POM, which exhibits excellent friction performance, is conventionally used, although the possibility of VOC emission is high. In the present disclosure, however, ingredients that are harmful to human beings, such as POM, are not included, whereby it is possible to improve the quality of air in a vehicle.

In addition, a method of manufacturing a vehicle part is performed using a resin composition for vehicle parts including ultra-high molecular weight siloxane. Consequently, it is possible to eliminate the application of silicone-based oil or to remarkably reduce the amount of silicone-based oil that is used, whereby it is possible to reduce manufacturing costs. Furthermore, the vehicle part is not stained with silicone-based oil, whereby it is possible to improve the quality of the vehicle part. Moreover, an ingredient of a material to which no oil is applicable may be replaced with the resin composition for vehicle parts, whereby it is possible to secure a new material that exhibits excellent friction resistance and wear resistance.

A resin composition for vehicle parts according to the present disclosure may include an alloy resin of polyamide and polyethylene, ultra-high molecular weight siloxane (UHMWS), and an inorganic filler. Specifically, the resin composition for vehicle parts may include 93 to 97.5 wt % of the alloy resin, 2 to 4 wt % of the ultra-high molecular weight siloxane (UHMWS), and 0.5 to 3 wt % of the inorganic filler.

The alloy resin may be added in an amount of 93 to 97.5 wt % based on the total weight of the resin composition for vehicle parts. If the content of the alloy resin is less than 93 wt %, the mechanical properties of the alloy resin may be reduced, and peeling and filler marking phenomena may occur in the vicinity of a vehicle part gate. Here, "filler marking" means that the inorganic filler is exposed on the surface of an injection-molded product, whereby the external appearance of the injection-molded product is deteriorated. If the content of the alloy resin is more than 97.5 wt %, the operating force of the vehicle parts may be increased due to a higher coefficient of friction than in a conventional silicone oil application system. The alloy resin may have a viscosity of 0.1 to 10 at 250° C. and a melting point of 215 to 225° C.

The alloy resin may be an alloy resin of the polyamide and the polyethylene. Preferably, the alloy resin includes 60 to 99 wt % of the polyamide and 1 to 40 wt % of the polyethylene. Particularly, the polyethylene exhibits high friction resistance, wear resistance, and impact resistance due to the self-lubrication characteristics thereof, and exhibits little hygroscopicity. The polyethylene may be added in an amount of 1 to 40 wt % based on the total weight of the alloy resin. If the content of the polyethylene is less than 1 wt %, friction resistance, wear resistance, and impact resistance may be reduced. If the content of the polyethylene is more than 40 wt %, compounding and injection molding may be deteriorated due to high viscosity. Preferably, the alloy resin includes 70 to 90 wt % of the polyamide and 10 to 30 wt % of the polyethylene.

The polyethylene may have a weight average molecular weight of 400,000 to 700,000 g/mol. If the weight average molecular weight of the polyethylene is less than 400,000 g/mol, friction resistance, wear resistance, and impact resistance may be reduced. If the weight average molecular weight of the polyethylene is more than 700,000 g/mol, sufficient melt flow may not be achieved due to high viscosity, whereby compounding may be difficult or impossible. Preferably, the polyethylene has a weight average molecular weight of 500,000 to 600,000 g/mol.

The ultra-high molecular weight siloxane may be added to the resin composition in order to reduce the coefficient of friction. Preferably, the ultra-high molecular weight siloxane is added in an amount of 2 to 4 wt % based on the total weight of the resin composition for vehicle parts. If the content of the ultra-high molecular weight siloxane is less than 2 wt %, the operating force of the vehicle parts may be increased due to a higher coefficient of friction than in a conventional silicone oil application system. If the content of the ultra-high molecular weight siloxane is more than 4 wt %, the mechanical properties of the alloy resin may be reduced, and a peeling phenomenon may occur in the vicinity of a vehicle part gate.

The ultra-high molecular weight siloxane (UHMWS) may include 65 to 75 wt % of siloxane polymer and 25 to 35 wt % of fumed silica. The ultra-high molecular weight siloxane may include an anchoring effect through mixing of and physical interactions between the ultra-high molecular weight siloxane polymer and the fumed silica, unlike a general ultra-high molecular weight siloxane polymer. The anchoring effect may maximally prevent migration of the ultra-high molecular weight siloxane. In the case in which migration of the ultra-high molecular weight siloxane is maximally prevented, the coefficient of friction may be minimized when the vehicle parts are operated, and friction resistance may be semi-permanently improved. As a result, the ultra-high molecular weight siloxane may provide semi-permanent friction resistance to the resin composition for vehicle parts based on the anchoring effect.

The fumed silica may be added in an amount of 25 to 35 wt % based on the total weight of the ultra-high molecular weight siloxane. If the content of the fumed silica is less than 25 wt %, the effect of preventing migration of the ultra-high molecular weight siloxane may be insignificant. If the content of the fumed silica is more than 35 wt %, particles may adhere to each other due to the relatively small specific surface area thereof, whereby the effect of the fumed silica being fixed to the siloxane polymer may be insignificant. Since the fumed silica has a large specific surface area, repulsive force between particles is maximized, whereby the particles do not adhere to each other. As a result, the fumed silica may be uniformly distributed in the siloxane polymer, thereby inducing the anchoring effect through physical interaction. In addition, the anchoring effect may provide semi-permanent friction resistance to the resin composition for vehicle parts. In addition, the fumed silica may have an average particle size of 1 to 10 nm and a specific surface area of 50 to 600 $m^2$/g. If the average particle size of the fumed silica is less than 1 nm, the effect of the fumed silica being fixed to the ultra-high molecular weight siloxane polymer may be insignificant. If the average particle size of the fumed silica is more than 10 nm, the effect of preventing migration of the ultra-high molecular weight siloxane may be insignificant.

The ultra-high molecular weight siloxane (UHMWS) may have a weight average molecular weight of 300,000 to 700,000 g/mol. If the weight average molecular weight of the ultra-high molecular weight siloxane is less than 300,000 g/mol, the effect of reducing the coefficient of friction of the resin composition may be insignificant. If the weight average molecular weight of the ultra-high molecular weight siloxane is more than 700,000 g/mol, physical interaction with the fumed silica may be reduced. Preferably, the ultra-high molecular weight siloxane has a weight average molecular weight of 350,000 to 450,000 g/mol.

The ultra-high molecular weight siloxane (UHMWS) may be formed in a pellet shape having a particle size of 0.1 to 10 In the case in which the ultra-high molecular weight siloxane has a pellet shape, easy dispersion is achieved at the time of compounding. If the particle size of the ultra-high molecular weight siloxane is less than 0.1 the particle size of the pellet is too small, whereby the effect of reducing the coefficient of friction may be insignificant. If the particle size of the ultra-high molecular weight siloxane is more than 10 the particle size of the pellet is too large, whereby the dispersion time may be increased. Preferably, the ultra-high molecular weight siloxane has a particle size of 1 to 5 If the content of the ultra-high molecular weight siloxane is high, however, the coefficient of friction at the interface between the vehicle parts may be reduced, and the alloy resin may be plasticized and thus softened. As a result, when a frictional load is applied to the alloy resin, the frictional surface of the alloy resin is increased due to the concave or depressed contact surface of the alloy resin, whereby there are limitations in reducing the overall frictional resistance. In the present disclosure, the inorganic filler, which is capable of increasing the surface hardness of the ultra-high molecular weight siloxane, is mixed with the alloy resin at an optimal rate in order to maximize both friction resistance and wear resistance.

The inorganic filler is included in order to increase the surface hardness of the resin composition for vehicle parts and to reduce the coefficient of friction thereof. 0.5 to 3 wt % of the inorganic filler may be included. If the content of the inorganic filler is less than 0.5 wt %, it is difficult to increase the surface hardness and to reduce the coefficient of friction. If the content of the inorganic filler is more than 3 wt %, a filler marking phenomenon may occur in the vicinity of a vehicle part gate, and the manufacturing costs of the vehicle parts may be increased.

The inorganic filler may be spherical zirconium dioxide. Conventionally, stratiform inorganic particles, such as talc, mica, montmorillonite, hectorite, vermiculite, saponite, bentonite, sepiolite, beidellite, or kaolinite, are used. If such stratiform inorganic particles are used, however, tensile elongation and impact strength are relatively decreased, although rigidity is increased. In the present disclosure, spherical zirconium dioxide is mixed as the inorganic filler, whereby it is possible to improve friction resistance and wear resistance due to the high hardness thereof. In addition, since the zirconium dioxide is spherical, it is possible to minimize the reduction of tensile elongation and impact strength, unlike other stratiform inorganic fillers.

The zirconium dioxide may have a crystal size of 0.2 to 12.5 $\mu$m. If the crystal size of the zirconium dioxide is less than 0.2 $\mu$m, impact strength and friction properties may be reduced. If the crystal size of the zirconium dioxide is more than 12.5 $\mu$m, tensile elongation and impact strength may be reduced. Preferably, the zirconium dioxide has a crystal size of 0.2 to 5 $\mu$m.

The present disclosure provides a vehicle part manufactured using the resin composition for vehicle parts. The vehicle part may be a headrest guide or a D-ring of a seat belt. However, the present disclosure is not limited thereto.

In addition, the present disclosure provides a method of manufacturing a vehicle part, the method including manufacturing a vehicle part having a predetermined shape using the resin composition for vehicle parts, wherein no silicone-based oil for friction reduction is applied to the vehicle part.

The method of manufacturing the vehicle part is capable of eliminating the use of silicone-based oil, which is applied to reduce the friction of the vehicle part, or of remarkably reducing the amount of silicone-based oil that is used. In addition, it is possible to improve the quality of air in a vehicle and apply the method even to materials to which oil is not applicable.

The step of manufacturing the vehicle part may be a step of injection-molding the composition into a vehicle part having a predetermined shape. The vehicle part may be a headrest guide or a D-ring of a seat belt. However, the present disclosure is not limited thereto.

Hereinafter, the present disclosure will be described in more detail with reference to concrete examples. However, the following examples are merely illustrations to assist in understanding the present disclosure, and the present disclosure is not limited by the following examples.

Example 1

A resin composition for vehicle parts was manufactured using a general method based on ingredients and a mixing ratio shown in Table 1 below.

Material Ingredients (1) Alloy resin: An alloy resin of 70 wt % of polyamide and 30 wt % of polyethylene was prepared. The polyethylene had a weight average molecular weight of 560,000 g/mol. The alloy resin had a viscosity of 1.0 at 250° C. and 5 kg and a melting point of 220° C. Specifically, KEPAMID 1915SM7 of KEP Company was used as the alloy resin.

(2) Ultra-high molecular weight siloxane: Ultra-high molecular weight siloxane formed in a pellet shape having a weight average molecular weight of 400,000 g/mol and a particle size of 1 to 3 $\mu$m was prepared. Specifically, GENIOPLASTo 3cular weight siloxane formed in a pellet shape having had a weight average molecular weight of hape. The vehicle part, or of remarkably reducing the amount of silicone-based oil that is used. In addition, it is ic surface area of 120 $m^2$/g.

(3) Silicone master batch: MB 50-011 of Dow Corning Company was prepared.

(4) Polytetrafluoroethylene (PTFE): Polymist XPP-511 of Solvay Company was prepared.

(5-1) Inorganic filler: Spherical zirconium dioxide having a crystal size of 0.2 $\mu$m was prepared. Specifically, EF-Extra of Z tech Company was used as the inorganic filler.

(5-2) Inorganic filler: Spherical molybdenum disulfide having a crystal size of 1.4 $\mu$m was prepared. Specifically, Moly Powder of SUMICO Lubricant Company was used as the inorganic filler.

TABLE 1

| Classification (wt %) | | Example | | Comparative Example | | | | | | | | |
|---|---|---|---|---|---|---|---|---|---|---|---|---|
| | | 1 | 2 | 1 | 2 | 3 | 4 | 5 | 6 | 7 | 8 | 9 |
| Alloy resin (PA/PE) | | 97.5 | 93 | 100 | 96 | 94.5 | 94 | 95.6 | 97.5 | 97.5 | 96.5 | 94.5 |
| Ultra-high molecular weight siloxane | | 2 | 4 | — | 1 | 5 | 2 | 4 | 2 | — | — | — |
| Silicone master batch | | — | — | — | — | — | — | — | — | 2 | — | — |
| PTFE | | — | — | — | — | — | — | — | — | — | 3 | 5 |
| Inorganic filler | Zirconium dioxide | 0.5 | 3 | — | 3 | 0.5 | 4 | 0.4 | — | 0.5 | 0.5 | 0.5 |

TABLE 1-continued

|  | Example | | Comparative Example | | | | | | | | |
|---|---|---|---|---|---|---|---|---|---|---|---|
| Classification (wt %) | 1 | 2 | 1 | 2 | 3 | 4 | 5 | 6 | 7 | 8 | 9 |
| Molybdenum disulfide | — | — | — | — | — | — | — | 0.5 | — | — | — |

Experimental Example 1

Samples were manufactured by injection-molding the resin compositions for vehicle parts manufactured according to Examples 1 and 2 and Comparative Examples 1 to 9 using a general method. Subsequently, the physical properties of the manufactured samples were measured using testing methods based on respective items. The results are shown in Tables 2 and 3 below. Specifically, the coefficient of kinetic friction and the specific wear rate were measured using a pin-on-disk testing method. In the pin-on-disk testing method, 2 kgf of each of the samples was placed on a plate made of steel (S45C), and the sample was reciprocated at a speed of 30 mm/s for 30 minutes in order to measure the coefficient of kinetic friction and the specific wear rate of the sample.

TABLE 2

| Item | Testing method | Unit | Value required for headrest guide | Example 1 | Example 2 | Comparative Example 1 |
|---|---|---|---|---|---|---|
| Tensile strength | ASTM D638 | MPa | 46 ↑ | 48 | 47 | 48 |
| Tensile elongation at break point | ASTM D638 | % | 69 ↑ | 100 | 110 | 100 |
| Flexural strength | ASTM D790 | MPa | 55 ↑ | 66 | 64 | 65 |
| Flexural modulus | ASTM D790 | MPa | 2,570 ↑ | 2,800 | 2,700 | 2,850 |
| IZOD impact (Notched) | ASTM D256 | J/m | 280 ↑ | 295 | 290 | 300 |
| Coefficient of kinetic friction | Pin-on-disk were testing (ISO 7148/ASTM G99) | — | 0.4 ↓ | 0.38 | 0.32 | 0.48 |
| Specific wear rate | | $mm^3/kgf \cdot km$ | 0.3 ↓ | 0.30 | 0.15 | 0.76 |
| Injection moldability | Evaluation of external appearance after injection | | — | — | — | — |

TABLE 3

| Item | Unit | Value required for headrest guide | Comparative Example 2 | 3 | 4 | 5 | 6 | 7 | 8 | 9 |
|---|---|---|---|---|---|---|---|---|---|---|
| Tensile strength | MPa | 46 ↑ | 48 | 45 | 47 | 45 | 47 | 47 | 46 | 45 |
| Tensile elongation at break point | % | 69 ↑ | 90 | 120 | 80 | 125 | 65 | 100 | 70 | 65 |
| Flexural strength | MPa | 55 ↑ | 67 | 62 | 67 | 63 | 64 | 65 | 63 | 60 |
| Flexural modulus | MPa | 2,570 ↑ | 2,900 | 2,600 | 2,950 | 2,750 | 2,900 | 2,750 | 2,700 | 2,800 |
| IZOD impact (Notched) | J/m | 280 ↑ | 285 | 310 | 265 | 295 | 270 | 290 | 265 | 235 |
| Coefficient of kinetic friction | — | 0.4 ↓ | 0.43 | 0.37 | 0.32 | 0.40 | 0.47 | 0.38 | 0.45 | 0.40 |
| Specific wear rate | $mm^3/kgf \cdot km$ | 0.3 ↓ | 0.52 | 0.25 | 0.10 | 0.70 | 0.62 | 0.32 | 0.64 | 0.42 |

TABLE 3-continued

| Item | Unit | Value required for headrest guide | Comparative Example | | | | | | | |
|---|---|---|---|---|---|---|---|---|---|---|
| | | | 2 | 3 | 4 | 5 | 6 | 7 | 8 | 9 |
| Injection moldability | Evaluation of external appearance after injection | — | — | Peeling in the vicinity of gate | Filler marking in the vicinity of gate | — | — | Peeling in the vicinity of gate | — | — |

Referring to the results shown in Tables 2 and 3, it can be seen that, for Comparative Example 1, the flexural strength and the flexural modulus were excellent, since only an alloy resin of polyamide and polyethylene was included, but the tensile strength, the impact strength, and the coefficient of kinetic friction were greatly reduced.

In addition, it can be seen that, for Comparative Example 2, the coefficient of kinetic friction and the specific wear rate did not satisfy the required conditions for physical properties, since a small amount of ultra-high molecular weight siloxane was added. It can be seen that, for Comparative Example 3, the tensile strength was reduced, since an excessive amount of ultra-high molecular weight siloxane was added, and a peeling phenomenon occurred in the vicinity of a vehicle part gate after injection molding.

For Comparative Example 4, the impact strength was low, since an excessive amount of inorganic filler was added, and a filler marking phenomenon occurred in the vicinity of a vehicle part gate. It can be seen that, for Comparative Example 5, the tensile strength, the coefficient of kinetic friction, and the specific wear rate were low, since a small amount of inorganic filler was added.

In addition, it can be seen that, for Comparative Example 6, in which molybdenum disulfide was used as the inorganic filler, the impact strength, the coefficient of kinetic friction, and the specific wear rate did not satisfy the required conditions for physical properties.

In addition, for Comparative Example 7, the specific wear rate was low, since a silicone master batch was mixed instead of the ultra-high molecular weight siloxane, and a peeling phenomenon occurred in the vicinity of a vehicle part gate after injection molding.

In addition, it can be seen that, for Comparative Examples 8 and 9, the impact strength, the coefficient of kinetic friction, and the specific wear rate did not satisfy the required conditions for physical properties, since PTFE was mixed instead of the ultra-high molecular weight siloxane.

In contrast, it can be seen that, for Examples 1 and 2, the tensile strength, the flexural strength, and the flexural modulus were high. In addition, it can be seen that the impact strength, the coefficient of kinetic friction, and the specific wear rate satisfied the required conditions for physical properties, compared to Comparative Example 1.

Experimental Example 2

Whether the operating force of headrest guides manufactured using the resin compositions according to Example 2 and Comparative Example 1 was increased due to the application of silicone oil thereto was determined using a push-pull gauge. The results are shown in Table 4 below.

TABLE 4

| | | Comparative Example 1 | | | | Example 2 | |
|---|---|---|---|---|---|---|---|
| | | Application of silicone oil | | Non-application of silicone oil | | Non-application of silicone oil | |
| Item | Unit | Up | Down | Up | Down | Up | Down |
| Operating force | kgf | 3.4 | 1.2 | 15.9 | 14.2 | 4.6 | 1.7 |

Referring to the results shown in Table 4 above, it can be seen that, for Example 2, the operating force when the silicone oil was not applied was similar to the operating force when the silicone oil was applied in Comparative Example 1. As a result, it can be seen that it is possible to increase the operating force while solving a problem in which costs are increased due to the application of the silicone oil and a problem in which people's hands are stained with the oil.

As is apparent from the foregoing, the resin composition for vehicle parts according to the present disclosure is obtained by mixing ultra-high molecular weight siloxane and an inorganic filler with an alloy resin of polyamide and polyethylene at an optimal mixing ratio. Consequently, the resin composition for vehicle parts exhibits improved friction resistance and wear resistance while maintaining excellent impact resistance and low hygroscopicity.

In addition, the resin composition for vehicle parts according to the present disclosure does not include ingredients that are harmful to human beings, such as POM, whereby it is possible to improve the quality of air in a vehicle.

In addition, the method of manufacturing the vehicle part according to the present disclosure is performed using a resin composition including ultra-high molecular weight siloxane. Consequently, it is possible to eliminate the application of silicone-based oil or to remarkably reduce the amount of silicone-based oil that is used, whereby it is possible to reduce manufacturing costs. Furthermore, the vehicle part is not stained with silicone-based oil, whereby it is possible to improve the quality of the vehicle part.

The effects of the present disclosure are not limited to those mentioned above. It should be understood that the effects of the present disclosure include all effects that can be inferred from the foregoing description of the present disclosure.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

The invention claimed is:

1. A resin composition for vehicle parts, the resin composition comprising:
   93 to 97.5 wt % of an alloy resin of polyamide and polyethylene;
   2 to 4 wt % of ultra-high molecular weight siloxane (UHMWS); and
   0.5 to 3 wt % of an inorganic filler;
   wherein the alloy resin comprises 60 to 99 wt % of the polyamide and 1 to 40 wt % of the polyethylene;
   wherein the ultra-high molecular weight siloxane (UHMWS) comprises siloxane polymer and fumed silica; and
   wherein the inorganic filler is spherical zirconium dioxide.

2. The resin composition of claim 1, wherein the polyethylene has a weight average molecular weight of 400,000 to 700,000 g/mol.

3. The resin composition of claim 1, wherein the alloy resin has a viscosity (MI, g/10 min) of 0.1 to 10 at 250° C. and a melting point of 215 to 225° C.

4. The resin composition of claim 1, wherein the ultra-high molecular weight siloxane (UHMWS) comprises 65 to 75 wt % of siloxane polymer and 25 to 35 wt % of fumed silica.

5. The resin composition of claim 4, wherein the fumed silica has an average particle size of 1 to 10 nm and a specific surface area of 50 to 600 m2/g.

6. The resin composition of claim 1, wherein the ultra-high molecular weight siloxane (UHMWS) has a weight average molecular weight of 300,000 to 700,000 g/mol.

7. The resin composition of claim 1, wherein the ultra-high molecular weight siloxane (UHMWS) is formed in a pellet shape having a particle size of 0.1 to 10 μm.

8. The resin composition of claim 1, wherein the zirconium dioxide has a crystal size of 0.2 to 12.5 μm.

9. A vehicle part manufactured using the resin composition of claim 1.

10. The vehicle part of claim 9, wherein the vehicle part is a headrest guide or a D-ring of a seat belt.

11. A method of manufacturing a vehicle part, the method comprising:
    manufacturing a vehicle part having a predetermined shape using the resin composition of claim 1, wherein no silicone-based oil for friction reduction is applied to the vehicle part.

12. The method of claim 11, wherein the step of manufacturing the vehicle part comprises injection-molding the composition into a vehicle part having a predetermined shape.

13. The method of claim 11, wherein the vehicle part is a headrest guide or a D-ring of a seat belt.

* * * * *